US 8,579,059 B2

(12) United States Patent
Teraya

(10) Patent No.: US 8,579,059 B2
(45) Date of Patent: Nov. 12, 2013

(54) HYBRID MOTOR VEHICLE AND METHOD OF CONTROLLING HYBRID MOTOR VEHICLE

(75) Inventor: Ryuta Teraya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 269 days.

(21) Appl. No.: 12/951,582

(22) Filed: Nov. 22, 2010

(65) Prior Publication Data

US 2011/0120789 A1 May 26, 2011

(30) Foreign Application Priority Data

Nov. 20, 2009 (JP) ................................ 2009-265519

(51) Int. Cl.
*B60W 10/00* (2006.01)
(52) U.S. Cl.
USPC ... 180/65.265; 320/104; 320/109; 180/65.25; 903/930
(58) Field of Classification Search
USPC ........ 320/103, 104, 109; 180/54.1, 165, 65.1, 180/65.22, 65.25, 65.26, 65.27, 65.285, 180/65.29, 65.31
See application file for complete search history.

(56) References Cited

U.S. PATENT DOCUMENTS

| 6,176,807 B1 | 1/2001 | Oba et al. | |
| 6,851,404 B2 | 2/2005 | Kojima | |
| 7,543,564 B2 * | 6/2009 | Holm et al. | 123/406.62 |
| 8,042,632 B2 * | 10/2011 | Wisniewski | 180/65.265 |
| 2001/0013702 A1 * | 8/2001 | Yanase et al. | 290/40 C |
| 2005/0115748 A1 * | 6/2005 | Lanier | 180/65.1 |

FOREIGN PATENT DOCUMENTS

| JP | 11205907 A | 7/1999 |
| JP | 2004-339952 A | 12/2004 |
| JP | 2007245753 A | 9/2007 |
| JP | 2008190416 A | 8/2008 |
| JP | 2009-119985 A | 6/2009 |

OTHER PUBLICATIONS

Office Action dated Jun. 28, 2011 from Japanese Application No. 2009-265519.

* cited by examiner

*Primary Examiner* — John Walters
*Assistant Examiner* — James Triggs
(74) *Attorney, Agent, or Firm* — Gifford, Krass, Sprinkle, Anderson & Citkowski, P.C.

(57) ABSTRACT

A hybrid motor vehicle includes: an internal combustion engine that outputs motive power for vehicle traction; an engine-motoring electric motor that motors the internal combustion engine; a vehicle traction electric motor that outputs motive power for vehicle traction; a secondary battery that supplies electric power to the engine-motoring electric motor and to the vehicle traction electric motor; and a pre-engine-start control device that controls the internal combustion engine and the engine-motoring electric motor so as to motor the internal combustion engine in a reverse rotation direction without performing fuel injection or ignition when the hybrid motor vehicle is traveling on motive power from the vehicle traction electric motor without operating the internal combustion engine, after a system of the hybrid motor vehicle is started.

8 Claims, 6 Drawing Sheets

HYBRID MOTOR VEHICLE AND METHOD OF CONTROLLING HYBRID MOTOR VEHICLE

CROSS REFERENCE TO RELATED APPLICATION

The present application claims priority of Japanese Patent Application No. 2009-265519 filed on Nov. 20, 2009, which is incorporated herein by reference in its entirety including the specification, drawings and abstract.

BACKGROUND OF THE INVENTION

1. Field of the Invention

The invention relates to a hybrid motor vehicle and a method of controlling the hybrid motor vehicle. More particularly, the invention relates to a hybrid motor vehicle that includes: an internal combustion engine that outputs motive power; an engine-motoring electric motor that is able to motor the internal combustion engine; a vehicle traction electric motor that outputs motive power; and a secondary battery that supplies electric power to the engine-motoring electric motor and to the vehicle traction electric motor, and also relates to a method of controlling the hybrid motor vehicle.

2. Description of the Related Art

In relation to hybrid motor vehicles in which a rotary shaft of an electric motor is connected to an axle via the transmission, and an output shaft of an internal combustion engine is attached to the rotary shaft or the electric motor via a friction clutch, Japanese Patent Application Publication No. 11-205907 (JP-A-11-205907) describes a hybrid motor vehicle in which the friction clutch is gradually engaged to motor the engine, while the vehicle is powered by the electric motor, until the engine speed reaches about 200 rpm to 300 rpm before fuel injection and ignition are started to start the engine, and then the motive power from the engine is used for the traction of the hybrid motor vehicle. In the described hybrid motor vehicle, the shock caused when the engine is started is avoided by gradually increasing the rotational speed of the engine by gradually transmitting torque to the engine via the friction clutch.

In addition, Japanese Patent Application Publication No. 2008-190416 (JP-A-2008-190416) describes an internal combustion engine control apparatus for a hybrid motor vehicle, which has an electric motor that motors an internal combustion engine, that controls the electric motor turn the internal combustion engine in the reverse direction if the temperature of the internal combustion engine is below a threshold temperature when the internal combustion engine is to be started. According to the described control apparatus, it is possible to greatly reduce the electric power that the electric motor consumes in order to start the internal combustion engine, by turning the internal combustion engine in reverse, and injecting fuel into the atmosphere in a cylinder containing air, and igniting the injected fuel.

However, in the hybrid motor vehicle described in JP-A-11-205907, because the engine is motored at the time of being started, fuel may leak from fuel injection valves due to insufficient oil tightness, and may be directly discharged from the engine, so that undesirable emissions may increase. Likewise, in the hybrid vehicle described in (JP-A-2008-190416), if the temperature of the internal combustion engine exceeds the threshold temperature, the internal combustion engine is started by turning the engine in the normal rotational direction, so that fuel may leak from fuel injection valves due to insufficient oil tightness, and may be directly discharged from the engine.

In recent years, hybrid motor vehicles have been equipped with a secondary battery mounted in the vehicle that may be charged using an external electric power source when the vehicle is stopped. When, after the vehicle is started, the power needed for the traction of the vehicle is below an engine-starting power, which is set beforehand as a power that is used to start the internal combustion engine, the vehicle travels on the power from the vehicle traction motor without starting the internal combustion engine until the amount of electricity stored in the secondary battery has decreased to a prescribed level. When the power needed for the traction of the vehicle exceeds the engine-starting power while the vehicle is traveling on the power from the vehicle traction motor, the internal combustion engine is started and the power from the internal combustion engine is used for the traction of the vehicle. In this type of hybrid motor vehicle, because the internal combustion engine is required to output high power immediately after being started, the internal combustion engine is operated under high load and high rotational speed immediately after being started. However, in some cases, if the internal combustion engine is started for the first time after the system of the hybrid motor vehicle is started, the high-load and high-speed operation of the internal combustion engine may be performed the engine has been sufficiently lubricated by oil.

SUMMARY OF INVENTION

The invention provides a hybrid motor vehicle that restrains deterioration of emissions when starting an internal combustion engine and allows sufficient lubrication of the internal combustion engine even when the internal combustion engine is operated under high load and high speed immediately after being started, and also provides a method of controlling the hybrid motor vehicle.

A first aspect of the invention relates to a hybrid motor vehicle. The hybrid motor vehicle includes: an internal combustion engine that outputs motive power for vehicle traction; an engine-motoring electric motor that motors the internal combustion engine; a vehicle traction electric motor that outputs motive power for vehicle traction; a secondary battery that supplies electric power to the engine-motoring electric motor and to the vehicle traction electric motor; and a pre-engine-start control device that controls the internal combustion engine and the engine-motoring electric motor so as to motor the internal combustion engine in a reverse rotation direction without performing fuel injection nor ignition during a post-system-start electric traction travel during which the hybrid motor vehicle is traveling on motive power from the vehicle traction electric motor without operating the internal combustion engine after a system of the hybrid motor vehicle is started.

According to the foregoing aspect of the invention, while the hybrid motor vehicle is traveling on motive power from the vehicle traction electric motor without operating the internal combustion engine after the system of the vehicle is started, the internal combustion engine is motored in the reverse rotation direction without performing fuel injection or ignition. Due to this motoring, the fuel leaked from the fuel injection valves due to low oil-tightness is sent to the intake side, so that it is possible to suppress oil from being discharged when starting the internal combustion engine, and therefore it is possible to restrain deterioration of emissions when starting the internal combustion engine. Because the motoring of the internal combustion engine in the reverse rotation direction feeds lubricating oil to various portions of the internal combustion engine, it is also possible to avoid operation of the internal combustion engine without sufficient lubricating oil. As a result, even if the internal combustion engine is operated at high load and high speed immediately after being started, the internal combustion engine may be operated with sufficient lubrication.

A second aspect of the invention relates to a method of controlling a hybrid motor vehicle that includes an internal combustion engine that outputs motive power for vehicle traction, an engine-motoring electric motor that motors the internal combustion engine, a vehicle traction electric motor that outputs motive power for vehicle traction, and a secondary battery that supplies electric power to the engine-motoring electric motor and to the vehicle traction electric motor. The method of controlling the hybrid motor vehicle includes controlling the internal combustion engine and the engine-motoring electric motor so as to motor the internal combustion engine in a reverse rotation direction without performing fuel injection nor ignition while the hybrid motor vehicle is traveling on motive power from the vehicle traction electric motor without operating the internal combustion engine after a system of the hybrid motor vehicle is started.

According to the foregoing aspect of the invention, while the hybrid motor vehicle travels on motive power from the vehicle traction electric motor without operating the internal combustion engine after the system of the vehicle is started, the internal combustion engine is motored in the reverse rotation direction without performing fuel injection nor ignition. Due to this motoring, fuel that may have leaked from the fuel injection valves due to low oil-tightness is sent to the intake side, so that it is possible to restrain the leaked oil from being discharged when the internal combustion engine is started, and therefore it is possible to restrain deterioration of emissions at the time of start of the internal combustion engine. Because the motoring of the internal combustion engine in the reverse rotation direction feeds oil to various portions of the internal combustion engine, it is also possible to avoid operating the internal combustion engine when it is insufficiently lubricated. As a result, even if the internal combustion engine operates under a high load and high speed immediately after being started, the internal combustion engine is adequately lubricated.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
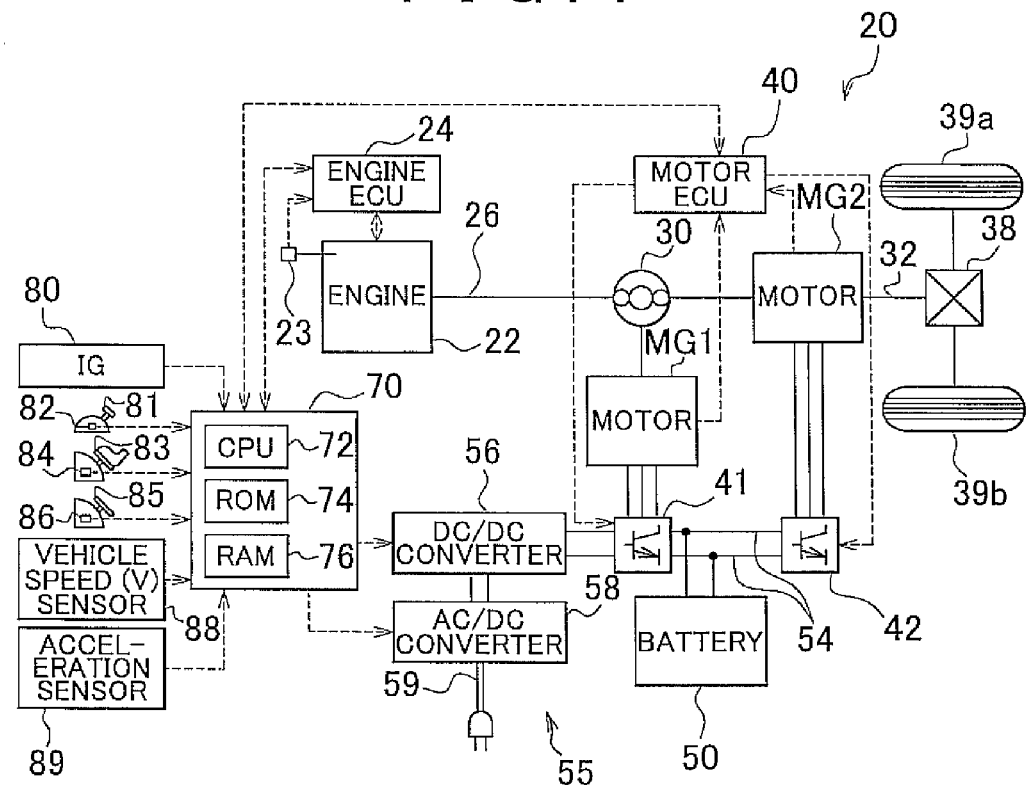
FIG. 1 shows the general construction of a hybrid motor vehicle according to an embodiment of the invention.

FIG. 1 shows the general configuration of a hybrid motor vehicle 20 according to an embodiment of the invention. The hybrid motor vehicle 20, as shown in FIG. 1, includes: an engine 22 that uses gasoline, light oil, etc. as fuel; an engine electronic control unit (hereinafter, referred to as "engine ECU") 24, which receives detection signals and the like from sensors that detect states of the engine 22, for example, coolant temperature Tw of the engine 22 detected by a coolant temperature sensor 23, that drives and controls the engine 22; a planetary gear 30 with a carrier that is connected to the crankshaft 26 of the engine 22 and a ring gear that is connected to a drive shaft 32 that is connected to driving wheels 39a and 39b via a differential gear 38; a motor MG1, which may be, for example, a synchronous generator-motor that has a rotor connected to the sun gear of the planetary gear 30; a motor MG2 which may be, for example, a synchronous generator-motor that has a rotor connected to the drive shaft 32; inverters 41 and 42 that drive the motors MG1 and MG2; a motor electronic control unit (hereinafter, referred to as "motor ECU") 40 that drives and controls the motors MG1 and MG2 through the switching-control of switching elements (not shown) of the inverters 41 and 42; a battery 50, such as a lithium-ion secondary battery; an electric charger 55, which includes a DC/DC converter 56 that converts the voltage of direct-current (DC) electric power and supplies the converted voltage to the battery 50, an AC/DC converter 58 that converts alternating-current (AC) electric power into DC electric power, and a power-supply cord 59; and a hybrid vehicle electronic control unit 70 that communicates with the engine ECU 24 and the motor ECU 40, and that controls the entire vehicle. The electric charger may be connected to electric power lines 54 that are connected to the battery 50 In addition, the engine ECU 24 computes the engine speed Ne based on the crank angle detected by a crank angle sensor (not shown), and the like. The motor ECU 40 computes the rotational speeds Nm1 and Nm2 of the motors MG1 and MG2 based on the rotational position of the rotor detected by a rotational position sensor (not shown), and the like.

The hybrid vehicle electronic control unit 70 is constructed as a microprocessor that includes a CPU 72. In addition to the CPU 72, the hybrid vehicle electronic control unit 70 includes ROM 74 that stores process programs, RAM 76 that temporarily stores data, input and output ports (not shown), and a communication port. The hybrid vehicle electronic control unit 70 receives, via the input port, various signals, such as ignition signals from an ignition switch 80; a shift position SP from a shift position sensor 82, which detects the operation position of a shift lever 81; an accelerator operation amount Acc from an accelerator pedal position sensor 84, which detects the amount of depression of an accelerator pedal 83; a brake pedal position BP from a brake pedal position sensor 86, which detects the amount of depression of a brake pedal 85; a vehicle speed V from a vehicle speed sensor 88, a vehicle acceleration α from an acceleration sensor 89, etc. The hybrid vehicle electronic control unit 70 outputs, via the output port, a switching control signal to the DC/DC converter 56, a switching control signal to the AC/DC converter 58, etc. Furthermore, the hybrid vehicle electronic control unit 70 also computes the amount of remaining charge (state of charge (SOC)) of the battery 50 based on an integrated value of the charge/discharge current detected by an electric current sensor (not shown) in order to manage the battery 50, and computes input/output limits Win and Wout that indicate the maximum permissible electric power with which the battery 50 may be charged or discharged based on the computed SOC and the temperature of the battery 50.

The hybrid motor vehicle 20 calculates the required torque to be output to the drive shaft 32 based on the vehicle speed V and the accelerator operation amount Acc of the accelerator pedal 83, and then controls the operation of the engine 22, the motor MG1 and the motor MG2 so that the required motive power corresponding to the required torque is output to the drive shaft 32. The operation control of the engine 22, the motor MG1 and the motor MG2 is performed in various modes, for example the following modes are performed. A torque conversion operation mode in which the engine 22 is operated and controlled so that the motive power corresponding to the required motive power is output from the engine 22, and the motor MG1 and the motor MG2 are controlled so that the entire motive power output from the engine 22 is output to the drive shaft 32. A charge/discharge operation mode in which the engine 22 is controlled to output a motive power corresponding to the sum of the required torque and the electric power that is needed in order to charge/discharge the battery 50 and the motor MG1 and the motor MG2 are controlled so that up to the entire amount or of the motive power t output from the engine 22, involving the charging/discharging of the battery 50, is output to the drive shaft 32 as the required motive power, with its torque being converted by the planetary gear 30, the motor MG1 and the motor MG2. A motor operation mode in which operation control is performed such that the operation of the engine 22 is stopped and a motive power from the motor MG2 corresponding to the demanded motive power is output to the drive shaft 32. Incidentally, both the torque conversion operation mode and the charge/discharge operation mode are modes in which the engine 22 and the motors MG1 and MG2 are controlled so that the required torque is output to the drive shaft 32 involving operation of the engine 22. Hereinafter, these modes can be collectively considered an engine operation mode.

Figure 2:
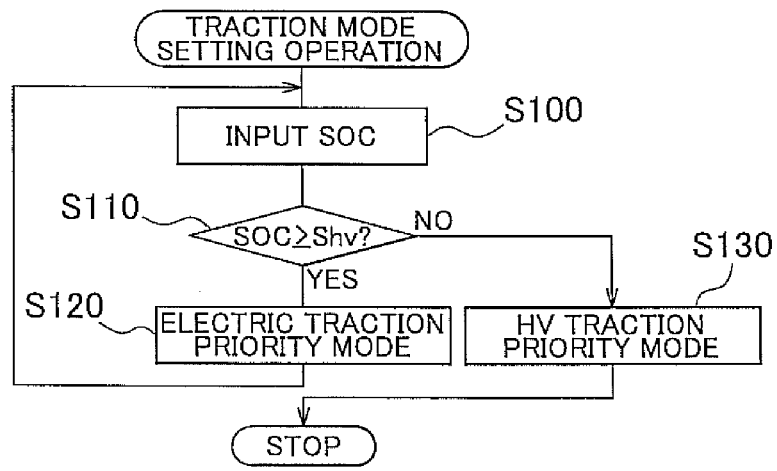
FIG. 2 is a flowchart showing an example of a traction mode setting operation that is executed by a hybrid vehicle electronic control unit according to the embodiment.

In the hybrid motor vehicle 20 of this embodiment, the charging/discharging of the battery 50 is controlled during travel so that when the vehicle 20 reaches home or a pre-set charging site, the SOC of the battery 50 will be controlled to a low level that is enough for the engine 22 to start. After the hybrid motor vehicle 20 is stopped at home or the pre-set charging site, the power-supply cord 59 of the electric charger 55 may be connected to a commercial electric power source, and the DC/DC converter 56 and the AC/DC converter 58 are controlled to full charge the battery 50 or charge the battery to a predetermined level below the fully charged state using the electric power from the commercial electric power source. Then, when the system of the vehicle 20 is started after the battery 50 is charged, a process is performed as shown by a traction mode setting operation, such as that shown in FIG. 2. That is, the hybrid motor vehicle 20 operates in an electric traction priority mode, in which the motor operation mode (electric traction) is given priority, until the SOC of the battery 50 reaches a threshold Shv at which the engine 22 may still be started (steps S100 to S120). After the SOC of the battery 50 has reached the threshold Shv, the vehicle operates in a hybrid traction priority mode, in which the vehicle traction in the engine operation mode (hybrid traction) is given priority (step S130).

Figure 3:
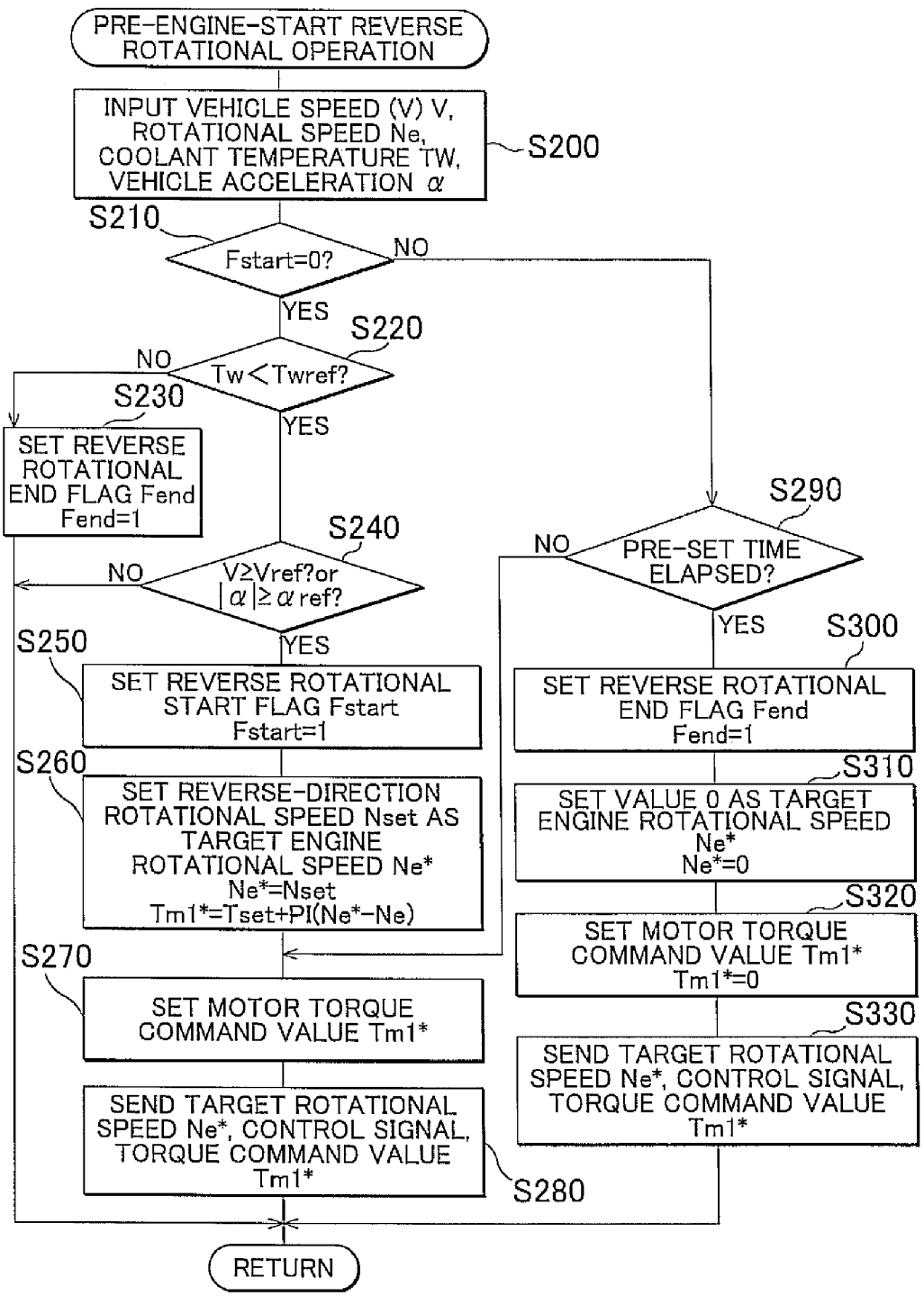
FIG. 3 is a flowchart showing an example of a pre-engine-start reverse rotation process operation that is executed by the hybrid vehicle electronic control unit.

Next the operation of the hybrid motor vehicle 20, more particularly, an operation of the hybrid motor vehicle 20 performed while the vehicle is in motion on electric traction in the electric traction priority mode without starting the engine 22 after the system of the hybrid motor vehicle 20 is started by turning on the ignition switch 80 will be described. FIG. 3 is a flowchart showing an example of a pre-engine-start reverse rotation operation that is executed by the hybrid vehicle electronic control unit 70. The operation is executed repeatedly at predetermined intervals (e.g., several msec) until a reverse rotation end flag Fend is set to 1 during the hybrid motor vehicle 20 is in motion on electric traction in the electric traction priority mode without operating the engine 22 after the system of the hybrid motor vehicle 20 is started. The reverse rotation end flag Fend is set to 1 through the pre-engine-start reverse rotation process operation or by an initial engine start operation (not shown) executed when the engine 22 is started after the system of the vehicle 20 is started.

When the pre-engine-start reverse rotation operation is executed, the CPU 72 of the hybrid vehicle electronic control unit 70 first inputs the data needed by the control, such as the vehicle speed V, the engine speed Ne, the coolant temperature (hereinafter, referred to as "coolant temperature") Tw, the vehicle acceleration $\alpha$, etc. (step S200). The engine ECU 24 may calculate the engine speed Ne based on the signal from a crank angle sensor (not shown) and communicated to the CPU 72. The coolant temperature Tw is detected by the temperature sensor 23, and is output from the engine ECU 24 to the CPU 72.

After data is received by the CPU 72, the value of a reverse rotation start flag Fstart is checked (step S210). Generally, the reverse rotation start flag Fstart is set to 0 by an initialization operation (not shown) when the system is started. Afterwards, the reverse rotation start flag Fstart is set to 1 when the motoring of the engine 22 in the reverse rotation direction is started by the pre-engine-start reverse rotation operation. Immediately after the system is started, the reverse rotation start flag Fstart is set to 0. If the reverse rotation start flag Fstart is 0, the coolant temperature Tw is compared with a threshold coolant temperature Twref, which is a temperature the engine 22 may be described as being sufficiently warm, for example, 40° C. or 45° C., or the like (step S220). If the coolant temperature Tw is equal to or above the threshold Twref, it is determined that it will not be necessary to motor the engine 22. Then, the reverse rotation end flag Fend is set to 1 (step S230), and the present execution of the routine ends. If the coolant temperature Tw is equal to or above the threshold Twref, it is determined that a long time has not elapsed following the stop of operation of the engine 22, and therefore it may be determined that the leakage of fuel from a fuel injection valve due to low oil tightness has not occurred yet and that the engine 22 may still be lubricated by the lubricating oil to some extent; therefore, the need to motor the engine 22 in the reverse rotation direction is low. The reverse rotation end flag Fend is then set to 1, and the pre-engine-start reverse rotation operation is not executed until the system is started.

If it is determined in step S220 that the coolant temperature Tw is below the threshold Twref, it is determined whether the vehicle speed V is equal to or exceeds the threshold vehicle speed Vref, or whether the absolute value of the vehicle acceleration $\alpha$ is equal to or exceeds a threshold $\alpha$ref (step S240). The threshold vehicle speed Vref may be determined beforehand as the vehicle speed at which dark noise caused by the motion of the vehicle will cover the noise and vibration produced by the motoring of the engine 22 in the revere rotation direction, so that the noise and vibration produced by the motoring will not cause discomfort to the driver or the occupants, and that the threshold vehicle speed Vref can be determined on the basis of the characteristics of the vehicle or the like. In addition, the threshold $\alpha$ref is determined beforehand as an acceleration or a deceleration of the vehicle at which the dark noise caused by the traveling of the vehicle will cover the noise and vibration produced by the motoring of the engine 22 in the revere rotation direction, so that the noise and vibration produced by the motoring will not cause discomfort to the driver or the occupants, and that the threshold αref can be determined on the basis of the characteristics of the vehicle or the like. If the vehicle speed V is below the threshold vehicle speed Vref, or the absolute value of the vehicle acceleration α is below the threshold αref, it is determined that the vibration and noise produced by the motoring of the engine 22 in the reverse rotation direction will cause discomfort to the driver and the occupants; therefore, the present execution of this operation ends without motoring of the engine 22 in the reverse rotation direction.

When the vehicle speed V is equal to or exceeds the threshold vehicle speed Vref or the absolute value of the vehicle acceleration α equal to or exceeds the threshold αref, the reverse rotation start flag Fstart is set to 1 (step S250). Then, a reverse rotation engine speed Nset is set as a target engine speed Ne* of the engine 22 (step S260), and a torque command value Tm1* of the motor MG1 is set to the sum of a torque Tset, initially set as the torque to be output from the motor MG1 in order to steadily motor the engine 22 at the reverse rotation engine speed Nset, and the value of a feedback term that equalizes the engine speed Ne and the target engine speed Ne* (step S270). After that, the target engine speed Ne* and a control signal that prevents fuel injection and ignition are sent to the engine ECU 24, and the set torque command value Tm1* is sent to the motor ECU 40 (step S280). Subsequently, the present execution of the operation ends.

After receiving the target engine rotational speed Ne* and the control signal that prevents fuel injection and ignition, the engine ECU 24 does not initiate fuel injection or ignition even if the motoring of the engine 22 in the reverse rotation direction is started. After receiving the torque command value Tm1*, the motor ECU 40 executes the switching control of the switching elements (not shown) of the inverter 41 so that the motor MG1 outputs a torque that corresponds to the torque command value Tm1*. Through the control executed in this manner, the engine 22 is motored in the reverse rotation direction without performing fuel injection or ignition. When the motor MG1 outputs a torque Tm1 for motoring the engine 22 in the reverse rotation direction, a torque of −Tm1/ρ acts on the drive shaft 32, where ρ is the gear ratio of the planetary gear 30 ((the number of teeth of the sun gear)/(the number of teeth of the ring gear)). Therefore, in a drive control operation (not shown) of the hybrid motor vehicle 20, when the motoring of the engine 22 in the reverse rotation direction is started, a torque command Tm2* of the motor MG2 is set to the sum of the demanded torque that is demanded of the drive shaft 32 for vehicle traction, and a torque that cancels out a torque (−Tm1/ρ) that acts on the drive shaft 32 when the engine 22 is motored in the reverse rotation direction. Therefore, it is possible to motor the engine 22 in the reverse rotation direction while outputting the demanded torque for the vehicle traction to the drive shaft 32. The reverse rotation engine speed Nset may be set to an engine speed such that allows sufficient lubrication of the engine 22 with the lubricating oil, for example, 500 rpm, 700, rpm, 1000 rpm, 1500 rpm, 2000 rpm, etc.

After the motoring of the engine 22 in the reverse rotation direction is started, it is determined in step S210 that the reverse rotation start flag Fstart is 1 the next time the pre-engine-start reverse rotation operation is executed. In that case, it is determined whether a pre-set time that allows the engine 22 to be sufficiently lubricated by the reverse rotation of the engine 22, for example, 2 seconds, 5 seconds, 7 seconds, 10 seconds, 20 seconds, etc., has elapsed following the start of the motoring of the engine 22 in the reverse rotation direction (step S290). After the predetermined time has elapsed, the setting the torque for rotating the engine 22 at the reverse-direction engine speed Nset as the torque command value Tm1* of the motor MG1 (step S270), and the sending the target engine speed Ne* and the control signal that prevents fuel injection and ignition to the engine ECU 24 and sending the set torque command value Tm1* to the motor ECU 40 (step S280) are performed, and the present execution of the operation ends.

After the predetermined time has elapsed from the start of the motoring of the engine 22 in the reverse rotation direction, the reverse rotation end flag Fend is set to 1 (step S300), the target engine speed Ne* is set to 0 (step S310), and the torque command value Tm1* of the motor MG1 is set to 0 (step S320). Then the target engine speed Ne* and the control signal that stops the motoring of the engine 22 in the reverse rotation direction are sent to the engine ECU 24, and the set value 0 of torque command value Tm1* is sent to the motor ECU 40 (step S330). Subsequently, the present execution of the operation ends.

According to the hybrid motor vehicle 20, while the vehicle 20 is traveling on electric traction in the electric traction priority mode, the engine 22 is motored in the reverse rotation direction by driving and controlling the motor MG1 without causing fuel injection nor the ignition. Therefore, even if fuel leaks from a fuel injection valve due to insufficient oil tightness, the leaked fuel is returned into the intake system of the engine 22, so that the leaked fuel is not discharged through the exhaust when the engine 22 is started. Thus, the hybrid motor vehicle 20 is able to restrain deterioration of emissions. Furthermore, because the motoring of the engine 22 in the reverse rotation direction is performed so that the engine 22 is lubricated by the lubricating oil, the hybrid motor vehicle 20 is able to restrain the drawbacks or inconveniences (e.g., piston seizure or breakage) that can be caused by insufficient lubrication after the engine 22 is started due to increase in the demanded vehicle traction power, even if the engine 22 is operated at high load and high speed immediately after being started.

Although in the hybrid motor vehicle 20, the engine 22 is motored in the reverse rotation direction to lubricate the engine 22 with the lubricating oil, the motoring of the engine 22 in the reverse rotation direction may also be performed at a low engine speed for a short time if the discharge of fuel caused by insufficient oil tightness of the fuel injection valves can be sufficiently restrained.

In the hybrid motor vehicle 20, while the hybrid motor vehicle 20 is traveling on electric traction in the electric traction priority mode without starting the engine 22 after the system of the hybrid motor vehicle 20 is started, the engine 22 is motored in the reverse rotation direction if the coolant temperature Tw is equal to or above the threshold coolant temperature Twref and the vehicle speed V is equal to or above the threshold vehicle speed Vref, or when the coolant temperature Tw is equal to or above the threshold coolant temperature Twref and the absolute value of the vehicle acceleration α is equal to or above the threshold acceleration αref. However, while the hybrid motor vehicle 20 is traveling on electric traction in the electric traction priority mode without starting the engine 22 after the system of the hybrid motor vehicle 20 is started, the motoring of the engine 22 in the reverse rotation direction may also be performed irrespective of the coolant temperature Tw, or the motoring of the engine 22 in the reverse rotation direction may also be performed irrespective of the vehicle speed V, or the motoring of the engine 22 in the reverse rotation direction may also be performed irrespective of the vehicle acceleration α. That is, while the hybrid motor vehicle 20 is traveling on electric traction in the electric traction priority mode, the engine 22 may be motored in the reverse rotation direction even if the coolant temperature Tw is equal to or below the threshold coolant temperature Twref, the vehicle speed V is below the threshold vehicle speed Vref, and the absolute value of the vehicle acceleration α is below the threshold acceleration αref. Furthermore, the engine 22 may be motored in the reverse rotation direction if the vehicle speed V or the absolute value of the vehicle acceleration α is equal to or exceeds the threshold vehicle speed Vref or the threshold acceleration αref, respectively, even if the coolant temperature Tw is equal to or below the threshold coolant temperature Twref. Motoring of the engine 22 in the reverse rotation direction may also be performed if the coolant temperature Tw is equal to or above the threshold coolant temperature Twref, even if the vehicle speed V and the absolute value of the vehicle acceleration α are both respectively below the threshold vehicle speed Vref and the threshold acceleration αref.

Figure 4:
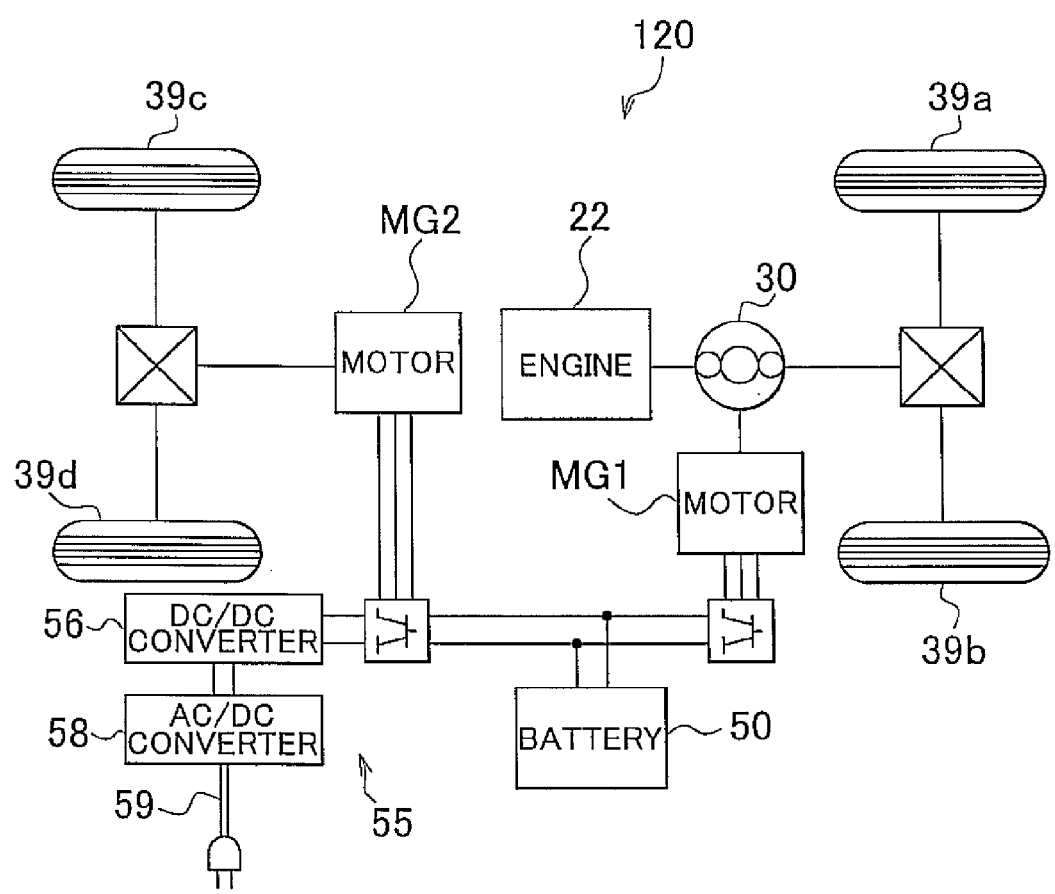
FIG. 4 shows the general configuration of a hybrid motor vehicle in accordance with a modified embodiment of the invention.

Although the motive power of the motor MG2 is output to the drive shaft 32 in the hybrid motor vehicle 20, the motive power of the motor MG2 may instead be output to a different axle that is connected to the drive shaft 32 (i.e., different from the axles to which the driving wheels 39a and 39b are connected) as in the hybrid motor vehicle 120 shown in FIG. 4 Accordingly, the motive power may be output to the axles to which driving wheels 39c and 39d are connected.

Figure 5:
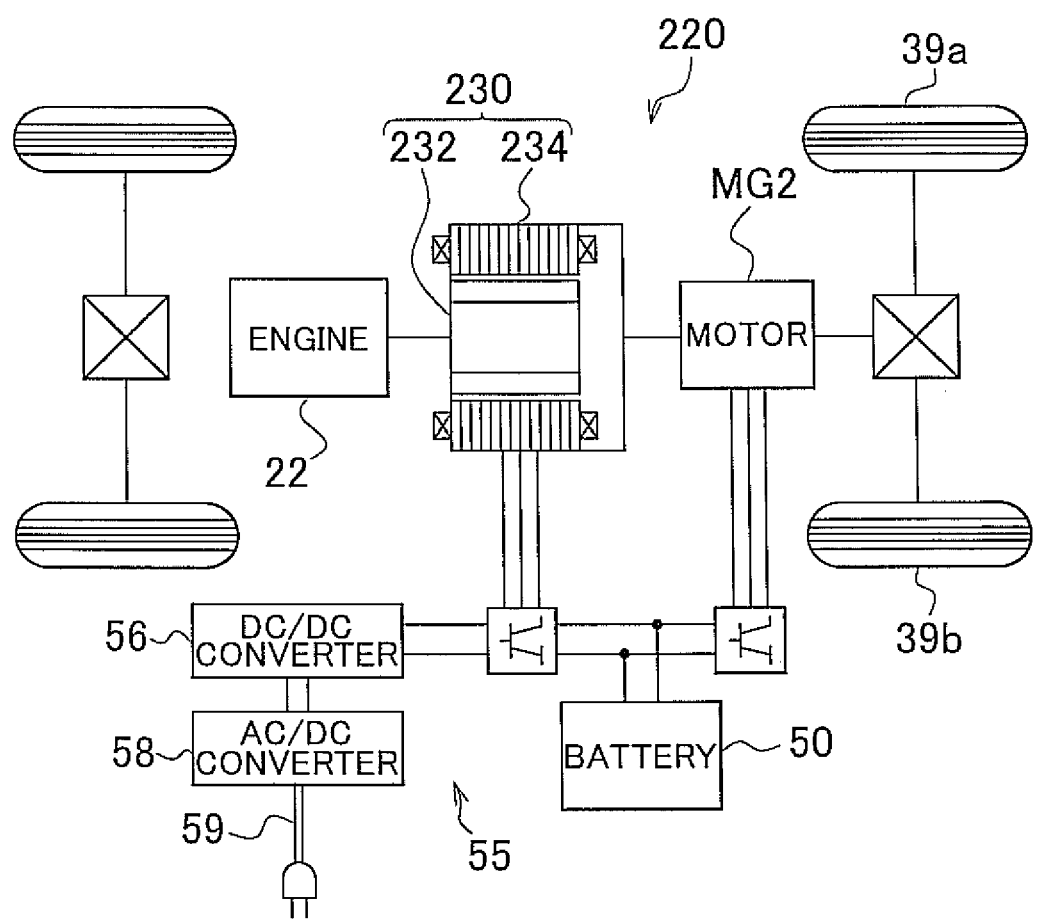
FIG. 5 shows the general configuration of a hybrid motor vehicle in accordance with another second modified embodiment.

In the hybrid motor vehicle 20, motive power of the engine 22 is output to the drive shaft 32 connected to the driving wheels 39a and 39b via the planetary gear 30. However, the configuration may be modified as exemplified by the hybrid motor vehicle 220 shown in FIG. 5, in which a twin-rotor electric motor 230, which has an inner rotor 232 that is connected to the crankshaft of the engine 22 and an outer rotor 234 that is connected to the drive shaft 32, outputs motive power to the driving wheels 39a and 39b transmits a portion of the motive power of the engine 22 to the drive shaft, which converts the remainder of the motive power of the engine 22 into electric power.

Figure 6:
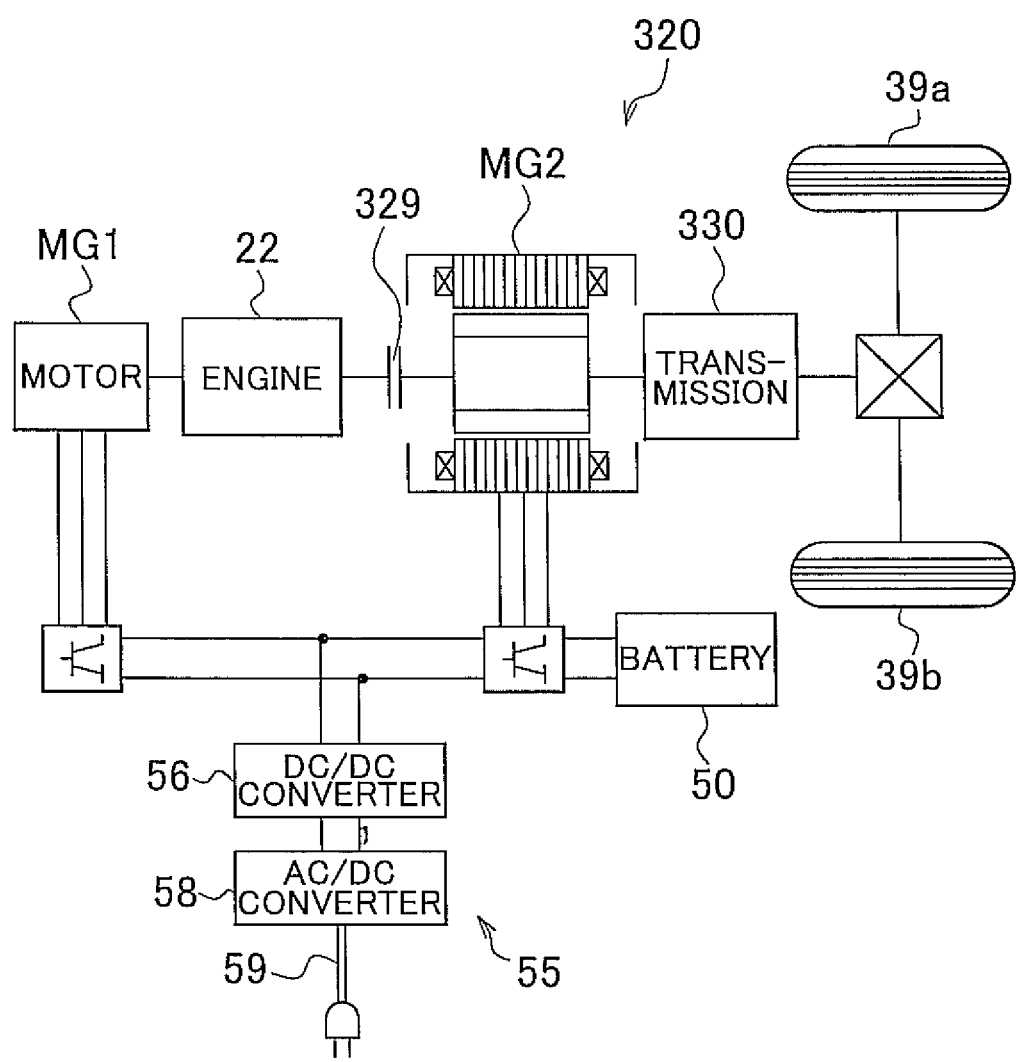
FIG. 6 shows the general configuration of a hybrid motor vehicle in accordance with a third modified embodiment.
Figure 7:
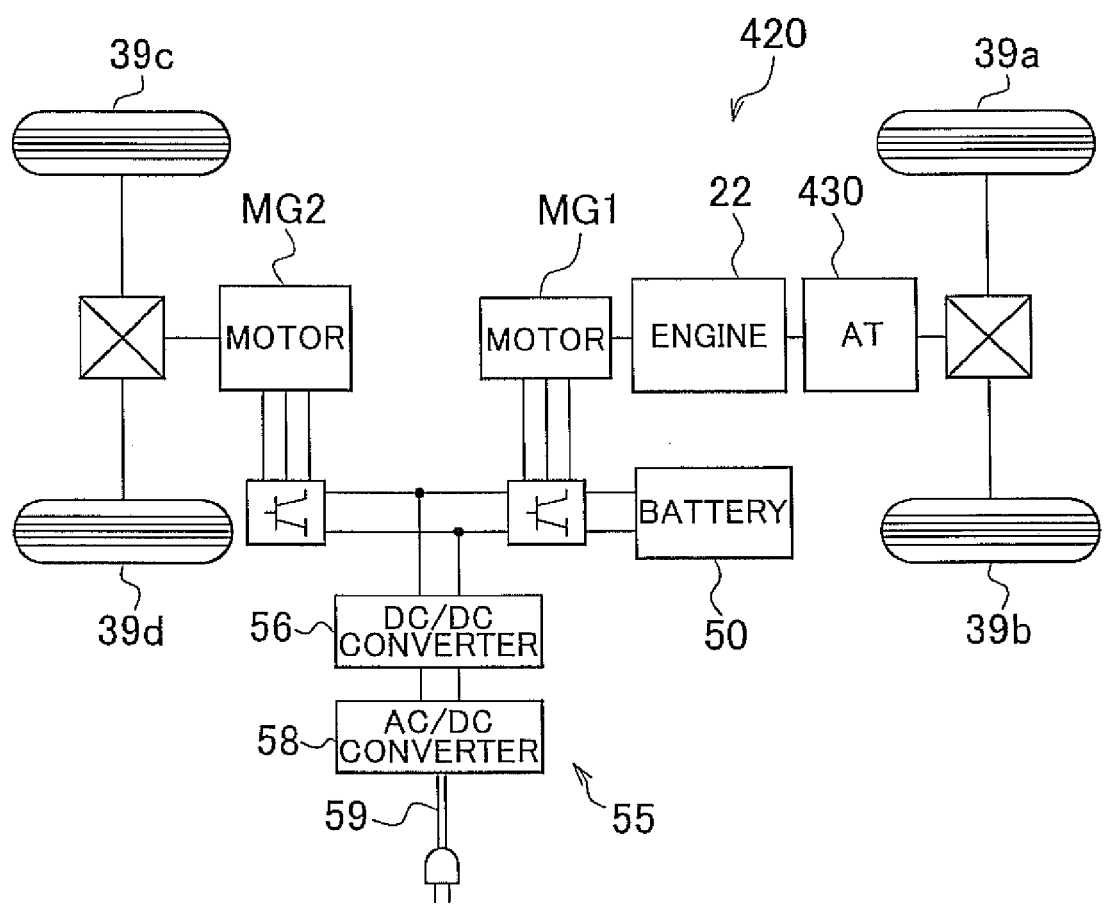
FIG. 7 shows the general configuration of a hybrid motor vehicle in accordance with a fourth modified embodiment.

In the hybrid motor vehicle 20, motive power from the engine 22 and the motor MG2 is output to the drive shaft 32 connected to the driving wheels 39a and 39b via the planetary gear 30. However, the configuration may be modified, as exemplified by a hybrid motor vehicle 320 shown in FIG. 6, so that the motor MG2 is attached, via a transmission 330, to a drive shaft connected to the driving wheels 39a and 39b, and the engine 22 is connected to the rotary shaft of the motor MG2 via a clutch 329, and a motor MG1 is attached to the crankshaft of the engine 22, so that motive power from the engine 22 and from the motor MG1 is output to the drive shaft via the rotary shaft of the motor MG2 and the transmission 330, and motive power from the motor MG2 is output to the drive shaft via the transmission 330. Alternatively, in accordance with hybrid motor vehicle 420 shown in FIG. 7, motive power from the motor MG1 and from the engine 22 may be output, via a transmission 430, to axles connected to the driving wheels 39a and 39b, and motive power from the motor MG2 may be output to different axles, for example, axles connected to wheels 39c and 39d, as shown in FIG. 7.

The hybrid motor vehicle 20 of the embodiment and the modified hybrid motor vehicles 120, 220, 320 and 420 are constructed as so-called plug-in hybrid vehicles that are equipped with an electric charger 55 that includes the DC/DC converter 56 and the AC/DC converter 58 for converting alternating-current power supplied from a commercial electric power source into direct-current power for charging the battery 50. However, the hybrid motor vehicle of the invention may also be applied to a hybrid motor vehicle that is not equipped with the electric charger 55 that includes the DC/DC converter 56 and the AC/DC converter 58.

That is, the hybrid motor vehicle of the invention may be constructed as any type of hybrid motor vehicle that is equipped with an engine that outputs vehicle traction power, an engine-motoring electric motor that motors the engine, and a vehicle traction electric motor that outputs vehicle traction power. In addition, the invention is not restricted to a system of hybrid motor vehicles, but may also be realized in the form of a method of controlling a hybrid motor vehicle.

Correspondence relations between major elements of the foregoing embodiment and major elements of the invention will be described below. The engine 22 may correspond to an "internal combustion engine" in the invention, and the motor MG1 may correspond to an "engine-motoring electric motor", and the motor MG2 may correspond to a "vehicle traction electric motor", and the battery 50 may correspond to a "secondary battery". Furthermore, the hybrid vehicle electronic control unit 70 that executes the pre-engine-start reverse rotation operation shown in FIG. 3, in which the engine 22 is motored in the reverse rotation direction by driving and controlling the motor MG1 without performing fuel injection nor ignition when the coolant temperature Tw is equal to or above the predetermined temperature Twref and the vehicle speed V is equal to or exceeds the threshold vehicle speed Vref or when the coolant temperature Tw equal to or above the predetermined temperature Twref and the absolute value of the vehicle acceleration α is equal to or above a predetermined acceleration αref while the hybrid motor vehicle 20 is traveling on electric traction without starting the engine 22 in the electric traction priority mode after the system of the hybrid motor vehicle 20 is started, may correspond to "pre-engine-start control means (device)" in the invention. Furthermore, the motor ECU 40 that receives the torque command value Tm1* and accordingly drives and controls the motor MG1, and the engine ECU 24 that receives the control signal and accordingly controls the engine 22 may also correspond to the pre-engine-start control means (device).

Herein, the "internal combustion engine" is not limited to an internal combustion engine that outputs motive power by using a hydrocarbon-base fuel, such as gasoline, light oil, etc., but may be any type of internal combustion engine, such as a hydrogen engine and the like, as long as the internal combustion engine is able to output vehicle traction power. The "engine-motoring electric motor" is not limited to the motor MG1 that is constructed as a synchronous generator-motor, but may be any type of electric motor, such as an induction electric motor or the like, as long as the electric motor is able to motor the internal combustion engine. The "vehicle traction electric motor" is not limited to the motor MG2 that is constructed as a synchronous generator-motor, but may be any type of electric motor, such as an induction electric motor or the like, as long as the electric motor is able to output vehicle traction power. The "secondary battery" is not limited to the battery 50 that is constructed as a lithium-ion secondary battery, but may be any type of secondary battery, such as a nickel metal hydride secondary battery, a nickel cadmium secondary battery, a lead storage cell, etc. The "pre-engine-start control means (device)" is not limited to a combination of the hybrid vehicle electronic control unit 70, the engine ECU 24 and the motor ECU 40, but may also be a single electronic control unit. Besides, the "pre-engine-start control means (device)" is not limited to means (device) for motoring the engine 22 in the reverse rotation direction by driving and controlling the motor MG1 without performing fuel injection nor ignition when the coolant temperature Tw is equal to or above the predetermined temperature Twref and the vehicle speed V is equal to or exceeds the predetermined vehicle speed Vref or when the coolant temperature Tw is equal to or above the predetermined temperature Twref and the absolute value of the vehicle acceleration $\alpha$ is equal to or above the predetermined acceleration $\alpha$ref while the hybrid motor vehicle 20 is traveling on electric traction in the electric traction priority mode without starting the engine 22 after the system of the hybrid motor vehicle 20 is started, but may be any means (device) as long as the means (device) controls the internal combustion engine and the engine-motoring electric motor so as to motor the internal combustion engine without performing fuel injection nor ignition while the hybrid motor vehicle is traveling on motive power from a traction electric motor without operating the internal combustion engine after the system of the hybrid motor vehicle is started. For example, when the hybrid motor vehicle 20 is operates in the electric traction priority mode without starting the engine 22, the pre-engine-start control means (device) may initiate motoring of the engine 22 in the reverse rotation direction also if the coolant temperature Tw is equal to or below the predetermined temperature Twref, the vehicle speed V is below the threshold vehicle speed Vref, and the absolute value of the vehicle acceleration $\alpha$ is below the threshold acceleration $\alpha$ref. Alternatively, the pre-engine-start control means (device) may initiate motoring of the engine 22 in the reverse rotation direction if the vehicle speed V is equal to or exceeds the predetermined vehicle speed Vref, or the absolute value of the vehicle acceleration $\alpha$ is equal to or above the predetermined acceleration $\alpha$ref regardless of whether the coolant temperature Tw is equal to or below the predetermined temperature Twref. Furthermore, the pre-engine-start control means (device) may initiate motoring of the engine 22 in the reverse rotation direction as long as the coolant temperature Tw is equal to or above the predetermined temperature Twref even if the vehicle speed V is below the predetermined vehicle speed Vref and the absolute value of the vehicle acceleration $\alpha$ is below the predetermined acceleration $\alpha$ref.

In the present invention, the pre-engine-start control device may control the internal combustion engine and the engine-motoring electric motor so as to motor the internal combustion engine in the reverse rotation direction if the vehicle speed is equal to or exceeds a predetermined vehicle speed, during the post-system-start electric traction travel.

This construction makes it possible to reduce the discomfort caused to occupants of the vehicle by the noise and vibration produced when the internal combustion engine is motored in the reverse rotation direction.

In the present invention, the pre-engine-start control device may control the internal combustion engine and the engine-motoring electric motor so as to motor the internal combustion engine in the reverse rotation direction if an acceleration of the vehicle is equal to or above a predetermined acceleration or if a deceleration of the vehicle is equal to or below a predetermined deceleration, during the post-system-start electric traction travel.

This construction makes it possible to reduce the discomfort caused to occupants of the vehicle by the noise and vibration produced when the internal combustion engine is motored in the reverse rotation direction.

In the present invention, the pre-engine-start control device may control the internal combustion engine and the engine-motoring electric motor so that the internal combustion engine is motored in the reverse rotation direction at a rotational speed within a range of 500 rpm to 2000 rpm, for a duration within a range of 1 second to 20 seconds, if the internal combustion engine is motored in the reverse rotation direction during the post-system-start electric traction travel.

In this construction, it is permissible that the pre-engine-start control device refrain from motoring the internal combustion engine in the reverse rotation direction when the coolant temperature of the internal combustion engine is equal to or above a predetermined temperature.

This is based on that when the coolant temperature of the internal combustion engine is at or above a certain high level, it can be determined that a long duration has not elapsed following the stop of operation of the internal combustion engine, that is, it can be determined that leakage of fuel from the fuel injection valve due to low oil-tightness has not occurred yet and that it is possible to achieve lubrication of the internal combustion engine to a certain degree.

In the present invention, the hybrid motor vehicle may further include an electric charger that is connected to an external electric power source and that that charges the secondary battery.

In the present invention, the hybrid motor vehicle may include a planetary gear mechanism whose three rotation elements are connected to three shafts that are an output shaft of the internal combustion engine, a rotary shaft of the engine-motoring electric motor, and a drive shaft connected to an axle. The vehicle traction electric motor may function also as an electricity generator that inputs motive power from the drive shaft and outputs motive power to the drive shaft, and the engine-motoring electric motor may be an electric motor that functions also as an electricity generator.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A hybrid motor vehicle comprising:
   an internal combustion engine that outputs motive power for vehicle traction;
   an engine-motoring electric motor that motors the internal combustion engine;
   a vehicle traction electric motor that outputs motive power for vehicle traction;
   a secondary cell that supplies electric power to the engine-motoring electric motor and to the vehicle traction electric motor; and
   a pre-engine-start control device that controls the internal combustion engine and the engine-motoring electric motor so as to motor the internal combustion engine in a reverse rotation direction without performing fuel injection nor ignition during a post-system-start electric traction travel during which the hybrid motor vehicle is traveling on motive power from the vehicle traction electric motor without operating the internal combustion engine after a system of the hybrid motor vehicle is started;
   wherein the pre-engine-start control device controls the internal combustion engine and the engine-motoring electric motor so that the internal combustion engine is motored in the reverse rotation direction at a rotational speed within a range of 500 rpm to 2000 rpm, for a duration within a range of 1 second to 20 seconds, if the internal combustion engine is motored in the reverse rotation direction during the post-system-start electric traction travel.

2. The hybrid motor vehicle according to claim 1, wherein the pre-engine-start control device controls the internal combustion engine and the engine-motoring electric motor so as to motor the internal combustion engine in the reverse rotation direction if a vehicle speed is equal to or exceeds a predetermined vehicle speed, during the post-system-start electric traction travel.

3. The hybrid motor vehicle according to claim 1, wherein the pre-engine-start control device controls the internal combustion engine and the engine-motoring electric motor so as to motor the internal combustion engine in the reverse rotation direction if an acceleration of the vehicle is equal to or above a predetermined acceleration or if a deceleration of the vehicle is equal to or below a predetermined deceleration, during the post-system-start electric traction travel.

4. A hybrid motor vehicle comprising:
an internal combustion engine that outputs motive power for vehicle traction;
an engine-motoring electric motor that motors the internal combustion engine;
a vehicle traction electric motor that outputs motive power for vehicle traction;
a secondary cell that supplies electric power to the engine-motoring electric motor and to the vehicle traction electric motor; and
a pre-engine-start control device that controls the internal combustion engine and the engine-motoring electric motor so as to motor the internal combustion engine in a reverse rotation direction without performing fuel injection nor ignition during a post-system-start electric traction travel during which the hybrid motor vehicle is traveling on motive power from the vehicle traction electric motor without operating the internal combustion engine after a system of the hybrid motor vehicle is started;
wherein the pre-engine-start control device refrain from motoring the internal combustion engine in the reverse rotation direction if a coolant temperature of the internal combustion engine is equal to or above a predetermined temperature.

5. The hybrid motor vehicle according to claim 1, further comprising an electric charger that is connected to an external electric power source and that charges the secondary battery.

6. A hybrid motor vehicle comprising:
an internal combustion engine that outputs motive power for vehicle traction;
an engine-motoring electric motor that motors the internal combustion engine;
a vehicle traction electric motor that outputs motive power for vehicle traction;
a secondary cell that supplies electric power to the engine-motoring electric motor and to the vehicle traction electric motor;
a pre-engine-start control device that controls the internal combustion engine and the engine-motoring electric motor so as to motor the internal combustion engine in a reverse rotation direction without performing fuel injection nor ignition during a post-system-start electric traction travel during which the hybrid motor vehicle is traveling on motive power from the vehicle traction electric motor without operating the internal combustion engine after a system of the hybrid motor vehicle is started; and
a planetary gear mechanism whose three rotation elements are connected to three shafts that are an output shaft of the internal combustion engine, a rotary shaft of the engine-motoring electric motor, and a drive shaft connected to an axle,
wherein the vehicle traction electric motor is an electric motor that functions also as an electricity generator, and
wherein the engine-motoring electric motor is an electric motor that functions also as an electricity generator.

7. A hybrid motor vehicle comprising:
an internal combustion engine that outputs motive power for vehicle traction;
an engine-motoring electric motor that motors the internal combustion engine;
a vehicle traction electric motor that outputs motive power for vehicle traction;
a secondary cell that supplies electric power to the engine-motoring electric motor and to the vehicle traction electric motor;
a pre-engine-start control device that controls the internal combustion engine and the engine-motoring electric motor so as to motor the internal combustion engine in a reverse rotation direction without performing fuel injection nor ignition during a post-system-start electric traction travel during which the hybrid motor vehicle is traveling on motive power from the vehicle traction electric motor without operating the internal combustion engine after a system of the hybrid motor vehicle is started; and
a pair-rotor electric motor which has an inner rotor that is connected to a crankshaft of the internal combustion engine, and an outer rotor that is connected to a drive shaft that outputs motive power to a driving wheel, and which transmits a portion of the motive power of the internal combustion engine to the drive shaft and converts remainder motive power into electric power,
wherein the vehicle traction electric motor is an electric motor that functions also as an electricity generator, and
wherein the engine-motoring electric motor is an electric motor that functions also as an electricity generator, and motors the internal combustion engine via the pair-rotor electric motor.

8. A hybrid motor vehicle comprising:
an internal combustion engine that outputs motive power for vehicle traction;
an engine-motoring electric motor that motors the internal combustion engine;
a vehicle traction electric motor that outputs motive power for vehicle traction;
a secondary cell that supplies electric power to the engine-motoring electric motor and to the vehicle traction electric motor; and
a pre-engine-start control device that controls the internal combustion engine and the engine-motoring electric motor so as to motor the internal combustion engine in a reverse rotation direction without performing fuel injection nor ignition during a post-system-start electric traction travel during which the hybrid motor vehicle is traveling on motive power from the vehicle traction electric motor without operating the internal combustion engine after a system of the hybrid motor vehicle is started;
wherein a first one of the vehicle traction electric motor is attached via a transmission to a drive shaft that is connected to a driving wheel, and the internal combustion engine is connected to a rotary shaft of the first one of the vehicle traction electric motor via a clutch, and a second one of the vehicle traction electric motor is attached to a crankshaft of the internal combustion engine; and wherein motive power from the internal combustion engine and from the second one of the vehicle traction electric motor is output to the drive shaft via the rotary shaft of the first one of the vehicle traction electric motor and the transmission, and motive power from the first one of the vehicle traction electric motor is output to the drive shaft via the transmission.

* * * * *